(12) United States Patent
Loomis et al.

(10) Patent No.: US 12,375,502 B2
(45) Date of Patent: Jul. 29, 2025

(54) PROVIDING SECURE DATA-REPLICATION BETWEEN A MASTER NODE AND TENANT NODES OF A MULTI-TENANCY ARCHITECTURE

(71) Applicant: Fortinet, Inc., Sunnyvale, CA (US)

(72) Inventors: Joseph Loomis, Arlington, VA (US); Abhishek Narula, Pune (IN); Pooja Singh, Pune (IN); Amit Jain, Pune (IN); Tushar Kanade, Pune (IN); Fnu Bharathram, Arlington, VA (US); Satish Mishra, Pune (IN)

(73) Assignee: Fortinet, Inc., Sunnyvale, CA (US)

( * ) Notice: Subject to any disclaimer, the term of this patent is extended or adjusted under 35 U.S.C. 154(b) by 120 days.

(21) Appl. No.: 16/784,048

(22) Filed: Feb. 6, 2020

(65) Prior Publication Data

US 2020/0259847 A1 Aug. 13, 2020

Related U.S. Application Data

(60) Provisional application No. 62/802,798, filed on Feb. 8, 2019.

(51) Int. Cl.
*H04L 9/40* (2022.01)
*G06F 21/55* (2013.01)
*H04L 43/0811* (2022.01)

(52) U.S. Cl.
CPC ........ *H04L 63/1416* (2013.01); *G06F 21/552* (2013.01); *H04L 43/0811* (2013.01); *H04L 63/02* (2013.01)

(58) Field of Classification Search
CPC . H04L 63/1416; H04L 43/0811; H04L 63/02; H04L 63/0227; G06F 21/552
USPC .......................................................... 726/22
See application file for complete search history.

(56) References Cited

U.S. PATENT DOCUMENTS

| | | | | |
|---|---|---|---|---|
| 6,272,341 B1 * | 8/2001 | Threadgill | ......... | H04B 7/18539 455/428 |
| 6,636,721 B2 * | 10/2003 | Threadgill | ......... | H04B 7/18539 455/12.1 |
| 7,586,871 B2 * | 9/2009 | Hamilton | ............. | H04W 76/20 370/328 |
| 9,069,930 B1 * | 6/2015 | Hart | ....................... | G06F 21/00 |

(Continued)

*Primary Examiner* — Michael W Chao
(74) *Attorney, Agent, or Firm* — Jaffery Watson Hamilton & DeSanctis LLP

(57) ABSTRACT

Systems and methods for providing selective data-replication among nodes of a distributed multi-tenancy MSSP architecture for performing secure orchestration and automated response (SOAR) are provided. According to one embodiment, a master SOAR node of an MSSP receives multiple messages via a secure router coupling a computing environment of the MSSP in communication with respective computing environments of multiple customers of the MSSP. The messages contain information regarding alerts relating to network infrastructure of the customers and the information is controlled by data sharing policies implemented by tenant SOAR nodes within the respective computing environments of the customers. Based on an investigation into an alert relating to a network infrastructure of a particular customer, the master SOAR node causes a workflow to be remotely executed by a tenant SOAR node within the computing environment of the particular customer.

18 Claims, 7 Drawing Sheets

(56) References Cited

U.S. PATENT DOCUMENTS

| | | | |
|---|---|---|---|
| 9,076,276 B1* | 7/2015 | Kator | G06Q 10/087 |
| 9,088,595 B2* | 7/2015 | Singhal | H04W 12/06 |
| 9,525,696 B2* | 12/2016 | Kapoor | G06F 16/2358 |
| 9,608,921 B2* | 3/2017 | Wormley | H04N 21/23424 |
| 9,693,046 B2* | 6/2017 | Unkel | G02B 30/25 |
| 9,800,608 B2* | 10/2017 | Korsunsky | G06F 21/55 |
| 9,853,948 B2* | 12/2017 | Sun | H04L 63/0209 |
| 9,860,208 B1* | 1/2018 | Ettema | H04L 63/0227 |
| 10,044,675 B1* | 8/2018 | Ettema | H04L 63/0227 |
| 10,333,898 B1* | 6/2019 | Moore | H04L 63/1433 |
| 10,389,684 B2* | 8/2019 | Polcha, Sr. | H04L 12/4641 |
| 10,432,647 B2* | 10/2019 | Dhakshinamoorthy | H04L 63/1416 |
| 10,509,917 B2* | 12/2019 | Rotem | G06F 21/606 |
| 10,530,811 B2* | 1/2020 | Black | H04L 63/02 |
| 10,680,887 B2* | 6/2020 | Pallas | H04L 41/0816 |
| 10,749,692 B2* | 8/2020 | Hojsik | H04L 9/3247 |
| 10,812,516 B2* | 10/2020 | Chenette | H04L 63/1433 |
| 10,992,535 B2* | 4/2021 | Johnson | H04L 41/0893 |
| 11,003,773 B1* | 5/2021 | Fang | G06K 9/6262 |
| 11,019,088 B2* | 5/2021 | Pratt | H04L 63/1433 |
| 11,158,207 B1* | 10/2021 | Sadeh-Koniecpol | G06F 21/566 |
| 11,259,180 B2* | 2/2022 | Black | H04L 63/0209 |
| 11,463,464 B2* | 10/2022 | Zadeh | H04L 61/103 |
| 11,539,720 B2* | 12/2022 | Reybok, Jr. | H04L 63/02 |
| 11,563,769 B2* | 1/2023 | Thomas | H04L 9/32 |
| 11,575,693 B1* | 2/2023 | Muddu | G06F 16/444 |
| 11,632,398 B2* | 4/2023 | Vidas | G06N 3/08 726/1 |
| 11,637,851 B2* | 4/2023 | Chenette | H04L 63/20 726/1 |
| 11,824,646 B1* | 11/2023 | Muddu | H04L 41/22 |
| 11,876,821 B1* | 1/2024 | Pratt | H04L 63/1425 |
| 11,985,160 B2* | 5/2024 | Thomas | H04L 63/1408 |
| 12,052,289 B2* | 7/2024 | Brannon | G06N 20/00 |
| 2006/0217136 A1* | 9/2006 | Bantukul | H04W 12/80 455/414.1 |
| 2007/0027919 A1* | 2/2007 | Mastel | G06Q 30/06 |
| 2007/0156659 A1* | 7/2007 | Lim | H04L 63/20 |
| 2009/0222876 A1* | 9/2009 | Goldberg | G06F 21/577 726/1 |
| 2009/0241175 A1* | 9/2009 | Trandal | G06F 21/42 726/7 |
| 2010/0039223 A1* | 2/2010 | Siedlarz | G06F 21/32 340/5.82 |
| 2010/0138370 A1* | 6/2010 | Wu | H04H 60/33 707/769 |
| 2011/0202755 A1* | 8/2011 | Orsini | H04L 63/0272 713/151 |
| 2012/0151272 A1* | 6/2012 | Behrendt | G06F 11/203 714/39 |
| 2013/0042106 A1* | 2/2013 | Persaud | G06F 21/606 713/165 |
| 2014/0201836 A1* | 7/2014 | Amsler | H04L 63/20 726/23 |
| 2015/0081885 A1* | 3/2015 | Thomas | H04L 41/5054 709/224 |
| 2015/0207813 A1* | 7/2015 | Reybok | H04L 63/145 726/22 |
| 2015/0222656 A1* | 8/2015 | Haugsnes | H04L 63/1441 726/23 |
| 2015/0264011 A1* | 9/2015 | Liang | G06F 9/4843 726/11 |
| 2016/0057116 A1* | 2/2016 | Charan | H04L 63/0471 713/153 |
| 2016/0150047 A1* | 5/2016 | O'Hare | H04L 67/1097 713/168 |
| 2016/0219024 A1* | 7/2016 | Verzun | H04L 9/34 |
| 2016/0330172 A1* | 11/2016 | Muttik | G06F 21/6245 |
| 2017/0019454 A1* | 1/2017 | Almohamedh | H04L 69/24 |
| 2017/0171231 A1* | 6/2017 | Reybok, Jr. | H04L 63/1433 |
| 2017/0171235 A1* | 6/2017 | Mulchandani | G06F 21/554 |
| 2017/0289178 A1* | 10/2017 | Roundy | H04L 63/1425 |
| 2017/0344754 A1* | 11/2017 | Kumar | G06F 21/6245 |
| 2017/0353477 A1* | 12/2017 | Faigon | G06F 21/554 |
| 2018/0027006 A1* | 1/2018 | Zimmermann | H04L 63/0227 726/11 |
| 2018/0027071 A1* | 1/2018 | Toepke | H04L 67/1095 709/217 |
| 2018/0248901 A1* | 8/2018 | Rieke | H04L 63/20 |
| 2018/0330333 A1* | 11/2018 | Gowru | G06Q 10/1093 |
| 2018/0367371 A1* | 12/2018 | Nagarajan | H04L 43/0823 |
| 2019/0068622 A1* | 2/2019 | Lin | H04L 63/1441 |
| 2019/0095241 A1* | 3/2019 | Ago | G06F 9/468 |
| 2019/0166088 A1* | 5/2019 | Krochik | H04L 41/0876 |
| 2019/0166099 A1* | 5/2019 | Hicks | H04L 63/164 |
| 2019/0182267 A1* | 6/2019 | Aher | G06F 11/302 |
| 2019/0324649 A1* | 10/2019 | Rodgers | G06F 9/544 |
| 2019/0380037 A1* | 12/2019 | Lifshitz | H04W 8/08 |
| 2020/0076578 A1* | 3/2020 | Ithal | H04L 63/0272 |
| 2020/0125725 A1* | 4/2020 | Petersen | H04L 43/065 |
| 2020/0278900 A1* | 9/2020 | Abdelsalam | G06F 11/3476 |
| 2023/0336525 A1* | 10/2023 | Polcha, Sr. | H04L 12/4641 |

* cited by examiner

PROVIDING SECURE DATA-REPLICATION BETWEEN A MASTER NODE AND TENANT NODES OF A MULTI-TENANCY ARCHITECTURE

CROSS-REFERENCE TO RELATED APPLICATIONS

This application claims the benefit of U.S. Provisional Application No. 62/802,798 filed on Feb. 8, 2019, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019-2020, Fortinet, Inc.

BACKGROUND

Field

Embodiments of the present invention generally relate to establishing a security orchestration and automated response in a multi-tenancy architecture. In particular, embodiments of the present invention relate to providing a multi-tenancy network implementation, which allows each customer tenant node to select what data leaves the premises and reaches the master node so that all sensitive information can stay with the customer node even when a summary of information is provided to the master node that runs the investigations.

Description of the Related Art

Cybercrime is a serious and rapidly growing threat. All companies with computer assets on a network exposed to the Internet are at risk of being victimized by cyber criminals resulting in what could become a major data breach compromising their own data and those of their customers. When breaches like these occur, they have a significant negative impact on a business' bottom line and future earning potential. The mitigation of such adverse consequences from cyberthreats has led to the emergence of managed security services providers (MSSPs), who work to provide a centralized service to multiple separate and independent clients. With the emergence of MSSPs, has surfaced the need to provide tailored, separate and segmented security service to end-users.

However, MSSPs face a number of challenges while using a centralized platform for automation and orchestration of various processes, which manage multiple customer organizations. For example, firstly, customers are concerned regarding privacy and management of sensitive information that leaves their premises and reside on shared databases, which are as used for multiple customers. Secondly, MSSPs investigate multiple formats of data as the customer environment for each customer might be different. Thus, addressing diversity ranging from Ingestion to Triaging via single console becomes more and more difficult. Thirdly, with every new customer onboard, the storage and computational requirements of the MSSPs increase significantly. Fourthly, MSSPs traditionally require a dedicated Virtual Private Network (VPN) to be established with each customer site to run incident investigations on customer machines, thereby burdening infrastructure and requiring the MSSPs to continually switch among the VPN connections to look into issues for different customers. In sum, security, heterogeneity, scale and network infrastructure are unique challenges associated with providing managed security services to multiple customers from a single platform.

SUMMARY

Systems and methods are described for providing selective data-replication among nodes of a distributed multi-tenancy MSSP architecture for performing secure orchestration and automated response (SOAR). According to one embodiment a master SOAR node of an MSSP receives multiple messages via a secure router coupling a computing environment of the MSSP in communication with respective computing environments of multiple customers of the MSSP. The messages contain information regarding alerts relating to network infrastructure of the customers and the information is controlled by data sharing policies implemented by tenant SOAR nodes within the respective computing environments of the customers. Based on an investigation into an alert relating to a network infrastructure of a particular customer, the master SOAR node causes a workflow to be remotely executed by a tenant SOAR node within the computing environment of the particular customer.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
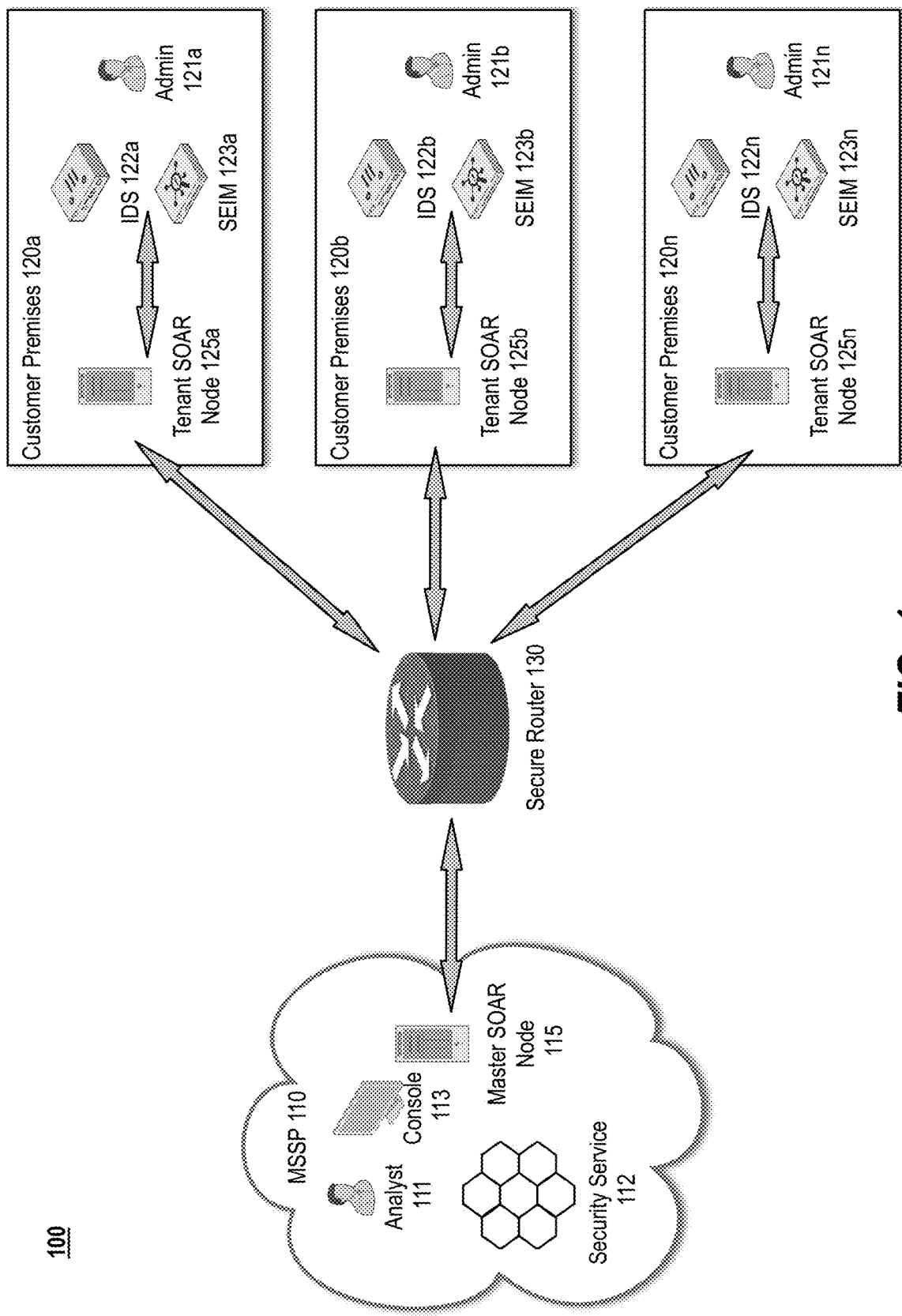
FIG. 1 conceptually illustrates a distributed multi-tenancy MSSP architecture for performing secure orchestration and automated response (SOAR) in accordance with an embodiment.

Systems and methods are described for providing selective data-replication among nodes of a distributed multi-tenancy MSSP architecture for performing secure orchestration and automated response (SOAR). In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

Exemplary embodiments will now be described more fully hereinafter with reference to the accompanying drawings, in which exemplary embodiments are shown. This invention may, however, be embodied in many different forms and should not be construed as limited to the embodiments set forth herein.

Thus, for example, it will be appreciated by those of ordinary skill in the art that the diagrams, schematics, illustrations, and the like represent conceptual views or processes illustrating systems and methods embodying various aspects of the invention. The functions of the various elements shown in the figures may be provided through the use of dedicated hardware as well as hardware capable of executing associated software and their functions may be carried out through the operation of program logic, through dedicated logic, through the interaction of program control and dedicated logic.

FIG. 1 conceptually illustrates a distributed multi-tenancy MSSP architecture 100 for performing secure orchestration and automated response (SOAR) in accordance with an embodiment. In the context of the present example, the distributed multi-tenancy MSSP architecture 100 includes an MSSP 110 and multiple customers (not shown) each having respective customer premises 120a-n that communicate with each other via a secure router 130. The MSSP 110 may provider a security service 112 on behalf of the customers.

In the context of the present example, the master SOAR node 115 (which may at times be referred to herein as simply the master node), receives and collects data (e.g., security events and alerts) from the customer premises 120a-n. Since data primarily resides at the tenant nodes in embodiments described herein, and the computations also happen at the tenant node, a single console (e.g., console 113) associated with the master node 115 can scale up to handling a large number of customers, thereby addressing the scalability issue noted in the Background.

In one embodiment, an analyst 111 of the MSSP 110 makes use of the console 113 to perform services on behalf of customers including generic investigation, enrichment and triage workflows on alerts received from customer premises 120a-n and to invoke customer specific procedures at respective tenant nodes (e.g., tenant SOAR nodes 125a-n). In embodiments described herein, the distributed multi-tenancy MSSP architecture 100 addresses the heterogeneity issue noted in the Background by simplifying tasks performed by the analyst 111. According to one embodiment, from the perspective of the master node 115 the procedures are more simplified and manageable than traditional approaches. Taking a "Phishing Email Alert" as an example, the analyst 111 at the master node 115 can simply invoke a generic "Investigate Phishing" workflow. As described in further detail below, in various embodiment, this automatically resolves and executes the procedure at the tenant node from which the alert was received. In this manner, the workflow run aligns with the tools and procedures on every tenant.

In the context of the present example, the customer premises 120*a-n* include respective tenant SOAR nodes 125*a-n* (which may at times be individually referred to herein as simply a tenant node and collectively as tenant nodes), respective intrusion detection systems (IDSs) 122*a-n*, respective security event and incident management (SEIM) systems 123*a-n*, and respective administrators 121*a-n*.

The tenant SOAR nodes 125*a-n* allow administrators 121*a-n* to define which events and alerts are to be auto-replicated to the master SOAR node 115 via the secure router 130. In this manner, the customers of the MSSP 110 can each independently select what data leaves the customer premises 120*a-n* and is provided to the MSSP 110. For example, the administrators 121*a-n* can specify that all sensitive information is to stay with the customer premises 120*a-n*. As described in further detail below, since in embodiments described herein the actual workflow execution (e.g., execution of automated responses) happens at the tenant node itself, the master node can identify what investigations are to be run based on summary information relating to the events and alerts.

In the context of the present example, the secure router 130 is responsible for guaranteed message delivery between a source node (e.g., tenant node 125*a*) and a destination node (e.g., master node 115) regardless of whether the target node is up or not at the time the message is sent by the source node. In one embodiment, as a result of using the secure router 130, network infrastructure overhead is reduced as there is no need for a VPN to be established between the MSSP 110 and each of the customer premises 120*a-n*. For example, the tenant nodes 125*a-n* and the master node 115 can simply rely on respective outbound Transmission Control Protocol (TCP) connectivity to the secure router 130. In this manner the extra network setup overhead and switching of VPNs as described in the Background can be avoided.

According to one embodiment, the security of the data is also ensured by the secure router 130. For example, each tenant node may use separate credentials to connect to the secure router 130 and its communication to the master node happens over a dedicated virtual channel, such that even when multiple tenant nodes share the same router, they have visibility only to their data and not to the data shared by other tenant nodes to the master node.

Figure 2:
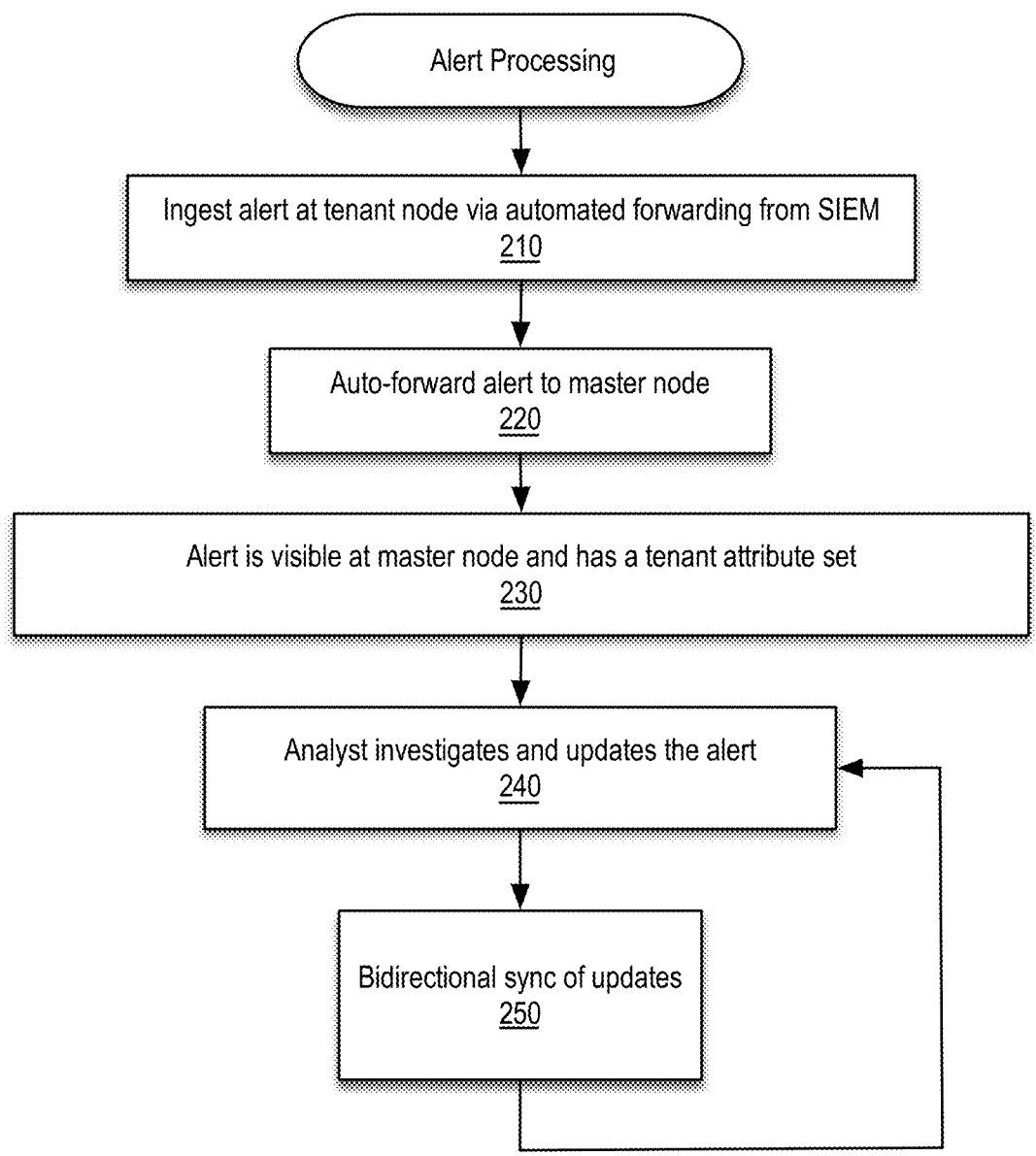
FIG. 2 is a high-level flow diagram illustrating alert processing in accordance with an embodiment.

FIG. 2 is a high-level flow diagram illustrating alert processing in accordance with an embodiment. FIG. 2 shows a high-level overview of data flow between the master node (e.g., master node 115) and its various tenant nodes (e.g., tenant nodes 125*a-n*). At block 210, a alert from a Security Information Management (SIM), STEM or IDS associated with a customer premises is ingested via Application Programming Interfaces (APIs) exposed by the tenant node of the customer premises. Alerts can optionally be auto-categorized and auto-enriched at the tenant node itself through the post-create workflows defined at the tenant node that extract observables from the alert and fetch reputation and relevant information based on the alert type.

At block 220, the alert is auto-forwarded to the master node. According to one embodiment, based on the data sharing policies (which are explained below with reference to FIG. 7), the eligible alerts are auto-forwarded to the master node for further investigation.

At block 230, the alert becomes visible at the master node and has a tenant attribute set. In one embodiment, every alert arriving at the master node includes a tenant attribute that identifies the tenant node from which it came, which helps the service provider (e.g., MSSP 110) group the alerts by customer.

At block 240, the analyst investigates and updates the alert. For example, the service provider analyst may add notes, update status and performs other updates on the alert during the life-cycle of the alert.

At block 250, bidirectional synchronization of updates is performed. In one embodiment, all updates done to an alert at the master node are synced back to the tenant node. Additionally, any updates done to the alert from the tenant via workflows or human interaction may also be synced back to the master node.

Figure 3:
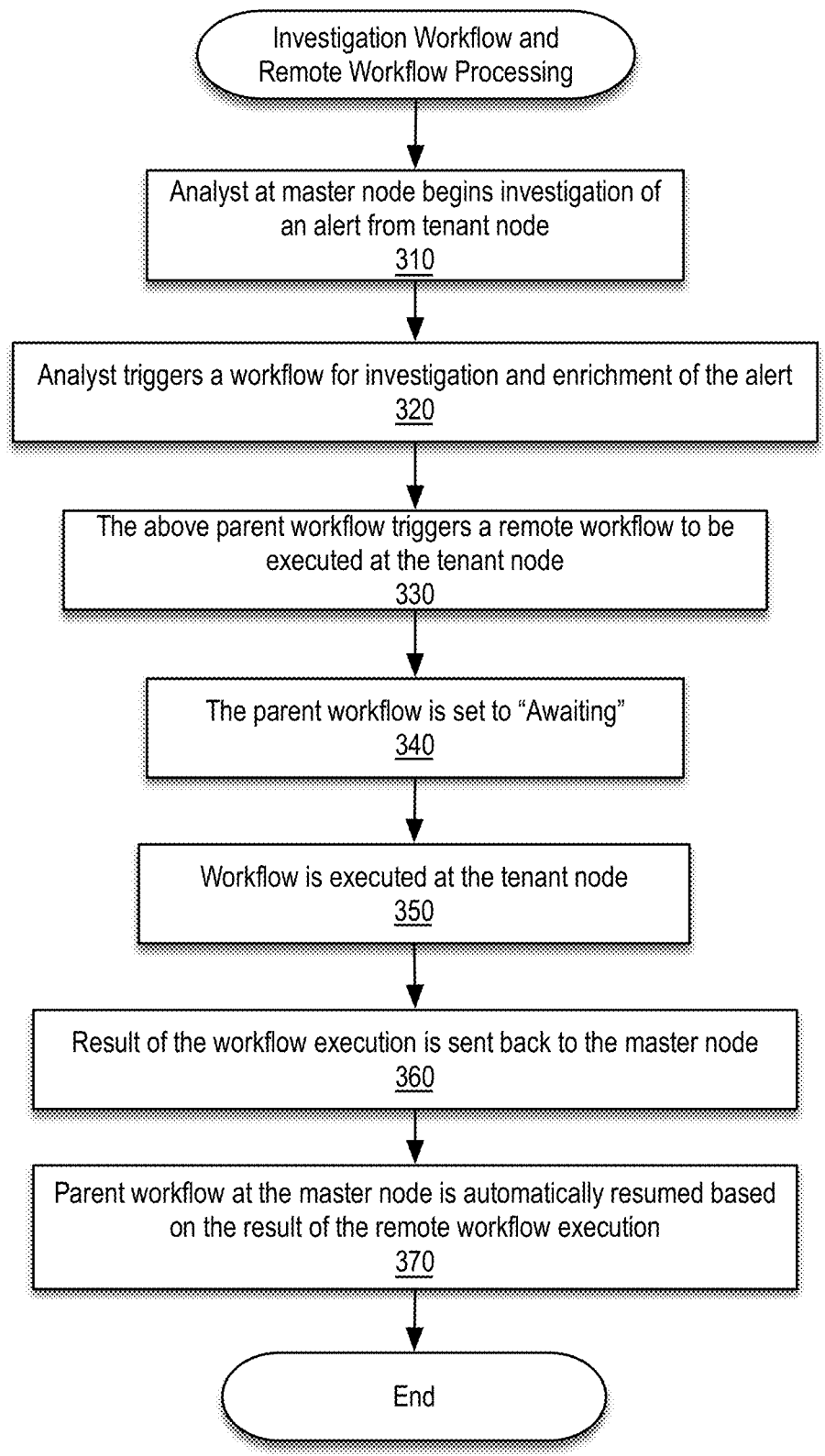
FIG. 3 is a high-level flow diagram illustrating investigation workflow and remote workflow processing in accordance with an embodiment.

FIG. 3 is a high-level flow diagram illustrating investigation workflow and remote workflow processing in accordance with an embodiment. FIG. 3 illustrates how the master node can trigger remote workflows at a tenant node in the investigation, enrichment and triaging phases of an alert. At block 310, the analyst at the mater node begins investigation of the alert from the tenant node.

At block 320, the analyst triggers a workflow for investigation and enrichment of the alert. For example, if the service provider needs to query the SIM, STEM or IDS at the customer premises of the tenant node for more data indicating a security posture compromise, or run any block action on a firewall or other network security system, that needs to run inside the customer's network infrastructure; the queries and actions can seamlessly be run from the master node without the need of an inbound network connectivity to the customer. In one embodiment, created workflows can be pushed to the tenant nodes from the master node and invoked via actions on the alert at the master node.

At block 330, the parent workflow at the master node triggers a remote workflow to be executed at the tenant node. As noted above, in embodiments described herein, no VPN is needed between the master node and the tenant node as the tenant node is in the customer's network premises and has connectivity to the required devices to allow the remote workflow to be performed.

At block 340, the parent workflow is set to "Awaiting." For example, the parent workflow at the master node awaits the results while the remote workflow is running.

At block 350, the workflow is executed at the tenant node. For example, the tenant node may query the SIM, STEM or IDS on behalf of the master node for additional data, for example, indicative of a security posture compromise, or direct a firewall or other network security device to block certain network traffic.

At block 360, the result of the workflow execution is sent back to the master node.

At block 370, the parent workflow at the master node is automatically resumed based on the result of the remote workflow execution. In this manner, the service provider can take the next set of actions based on the results.

Figure 4:
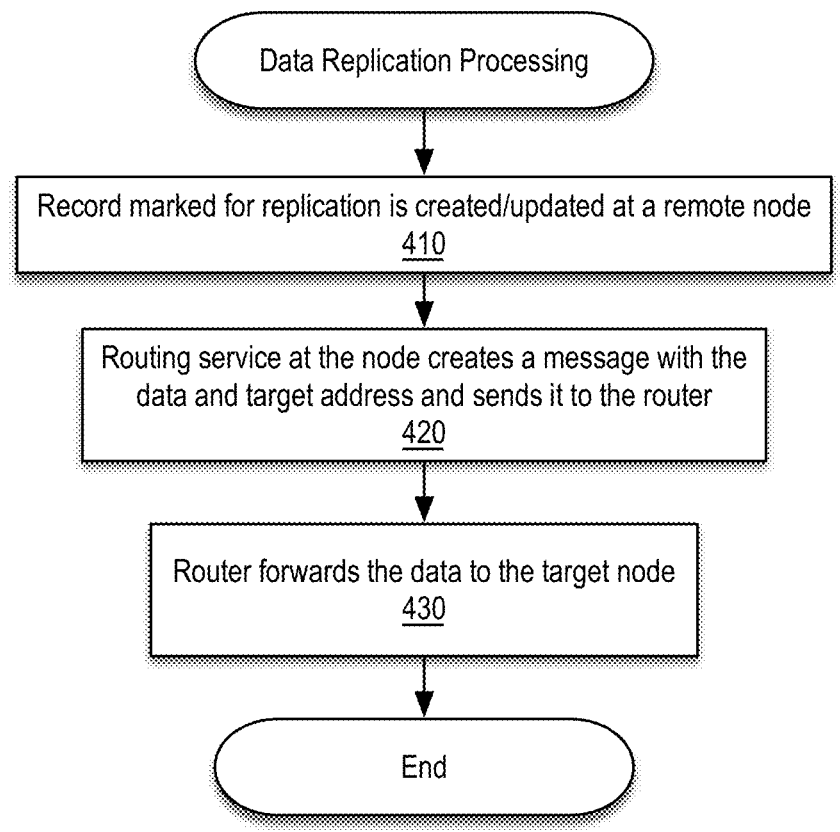
FIG. 4 is a flow diagram illustrating data replication processing via a secure router in accordance with an embodiment.

FIG. 4 is a flow diagram illustrating data replication processing via a secure router in accordance with an embodiment. FIG. 4 explains the infrastructural use of a secure router as an intermediary device responsible for routing appropriate data to appropriate tenant nodes. According to one embodiment, an intermediate router (e.g., secure router 130) can be used to handle message routing between the master and the tenant nodes asynchronously, securely and in a guaranteed fashion. As noted above, in such an embodiment, the nodes do not need direct network connectivity to each other; instead, each node relies on outbound network connectivity to the router, thereby eliminating a great deal of traditional network infrastructure overhead.

At block 410, a record marked for replication is created/updated at a remote node.

At block 420, when a record eligible for auto-replication is created or updated at either the master or tenant node, a routing service running within the node creates a message with the data to be replicated and an address of the destination node and posts the message to the router.

At block 430, the router forwards the data to the target node. In one embodiment, the router ensures delivery of the message to the destination asynchronously, without the nodes having to worry about it. For example, as described further below with reference to FIG. 6 if the target node is not online or connectivity to it is lost at the time the message arrives, the router persists the message until the target node comes back online and picks up the messages with its addresses on them and in the correct sequence.

Figure 5:
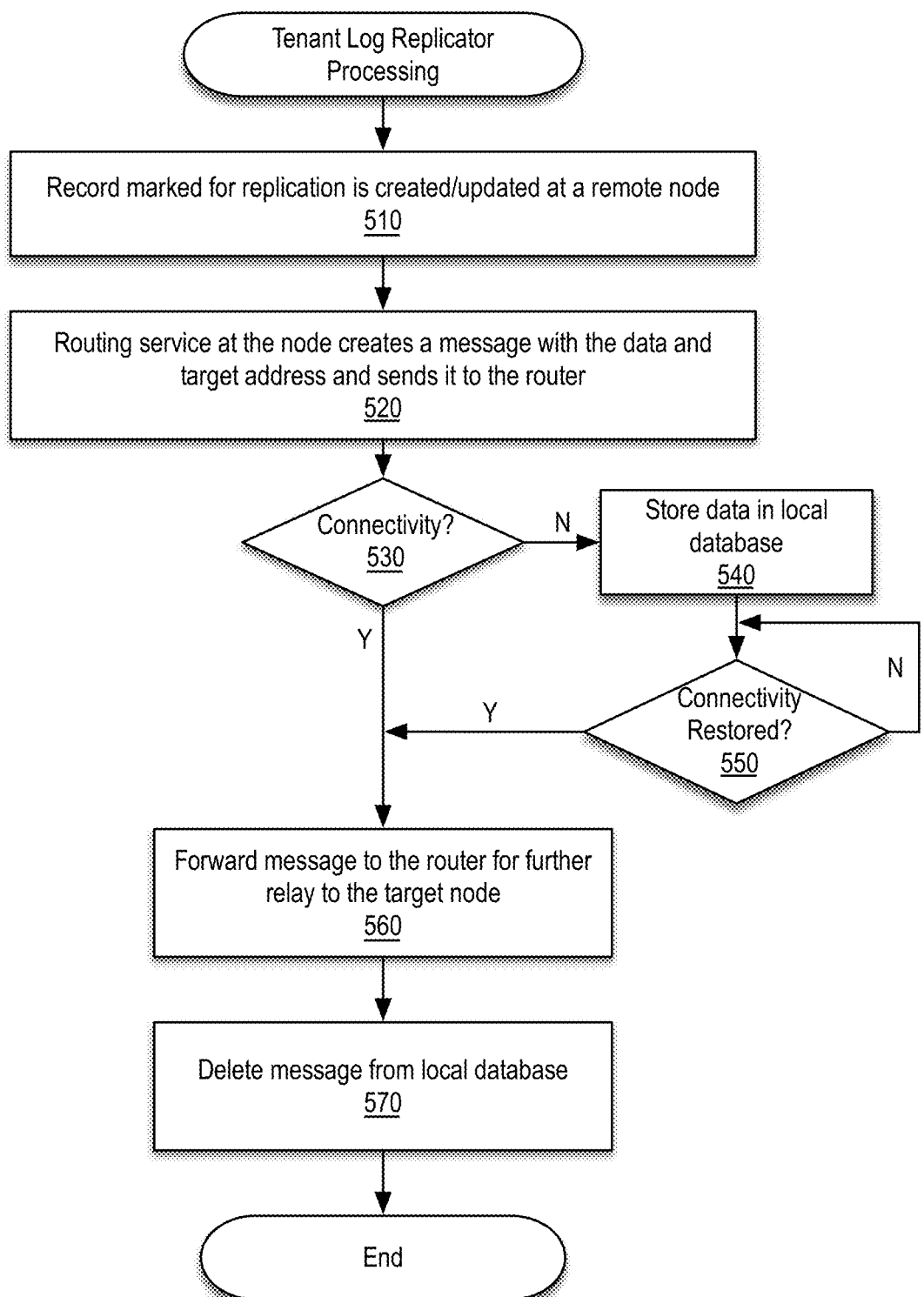
FIG. 5 is a flow diagram illustrating tenant log replicator processing in accordance with an embodiment.

FIG. 5 is a flow diagram illustrating tenant log replicator processing in accordance with an embodiment. In the context of the present example, a local log replicator located at the tenant node continues to aggregate log data in the event of connectivity disruption between any of the participating nodes and the secure router. The use of a local replicator log database at each of the nodes in accordance with an embodiment guarantees the delivery of messages.

At block 510, a record marked for replication is created/updated at a remote node.

At block 520, when a record eligible for auto-replication is created at a tenant node, a message with a copy of the updates is prepared by the routing service to be delivered to the master node (or from the master node to the tenant node if the record is updated at the master node). The routing service posts this message to the router with an address of the destination.

At decision block 530, it is determined if there is connectivity from the node to the router. If so, then processing continues with block 560; otherwise, processing branches to block 540. For example, if the network connectivity of the node is broken due to a network glitch, planned maintenance or the like, the message delivery should be reattempted to keep the data at both the nodes in sync.

At block 540, the data is stored in a local database. For example, the routing service at each node in can maintain a local replicator log and any message that cannot be delivered to the router due to connectivity loss may be stored in the replicator log.

At decision block 550, a determination is made if connectivity has been restored. If so, then processing continues with block 560; otherwise processing loops back to decision block 550. For example, the node keeps trying to re-connect to the router and as soon as the connectivity is restored, the log is replayed at block 560. In one embodiment, in order to maintain the sequence of message delivery, any new message arriving for replication should be sent forwarded until the backlog is cleared, hence such new messages will also be written to the replicator log if replay is on.

At block 560, the message is forwarded to the router for further relay to the target node.

At block 570, the message is deleted from the local database.

Figure 6:
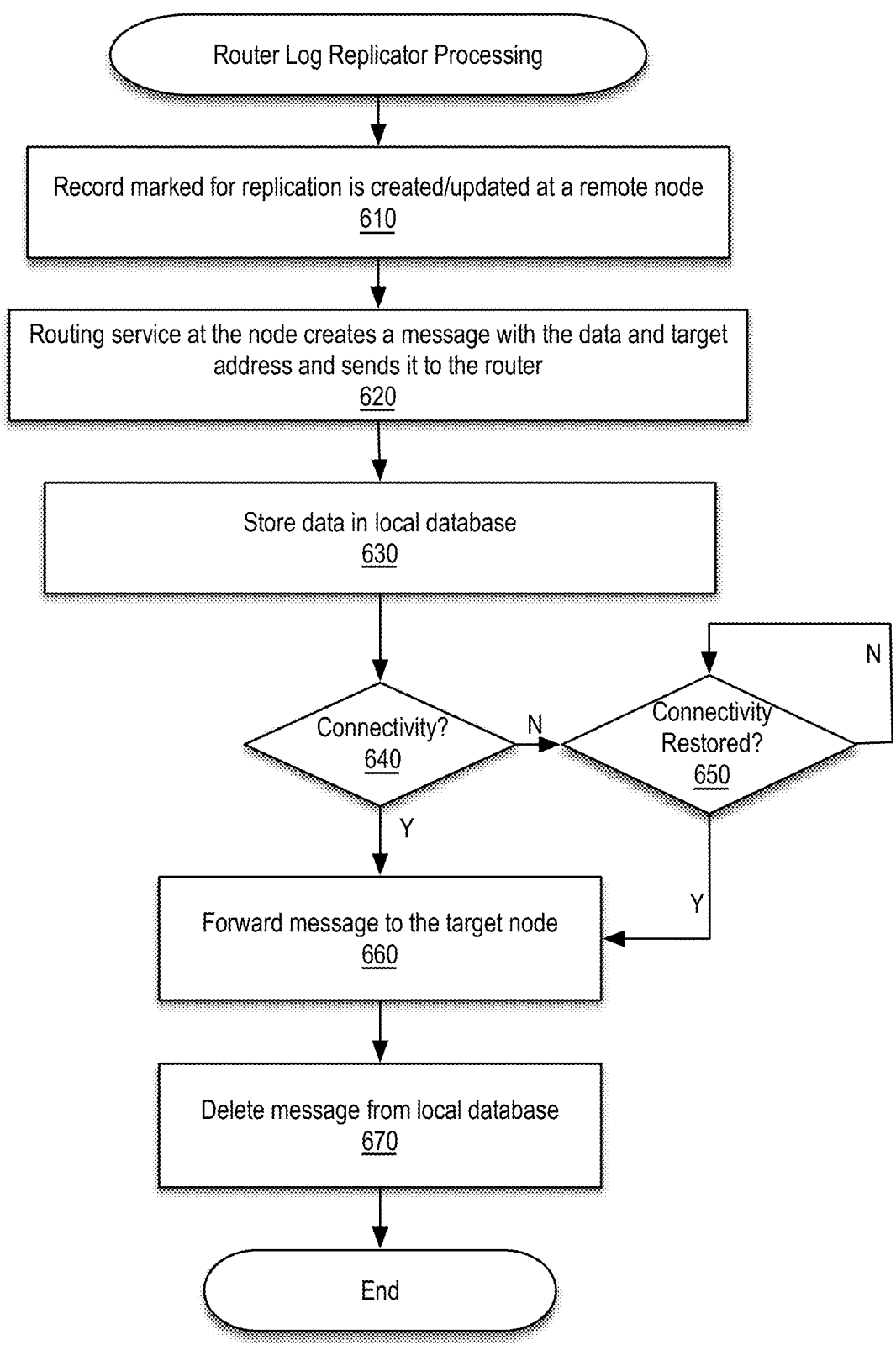
FIG. 6 is a flow diagram illustrating router log replicator processing in accordance with an embodiment.

FIG. 6 is a flow diagram illustrating router log replicator processing in accordance with an embodiment. In the context of the present example, a local log replicator located at the secure router continues to aggregate log data in the event of connectivity disruption between the secure router and any of the participating nodes. The use of the local database at the router in accordance with an embodiment for ensuring guarantees delivery of messages to the target node.

At block 610, a record marked for replication is created/updated at a remote node.

At block 620, when a record eligible for auto-replication is created or updated at either the master or tenant node, a routing service running within the node creates a message with the data to be replicated and an address of the destination node and posts the message to the router.

At block 630, the data is stored in a local database within the router. For example, whenever a replication message arrives at the router with an address of the destination, the router puts it in a message queue of the destination node At decision block 640, it is determined if there is connectivity from the router to the destination node. If so, then processing continues with block 660; otherwise, processing branches to decision block 650. For example, if the destination node is not connected to the router at the time the message arrives, the message is persisted locally so that it is available for consumption as soon as the target node comes online. Hence, the router first stores a copy of each message into a local database at block 630.

At decision block 650, it is determined if connectivity has been restored. If so, then processing continues with block 660; otherwise processing loops back to decision block 650.

At block 660, the message is forwarded to the target (destination) node. For example, responsive to connectivity being restored between the router and the destination node, the message is pulled from the message queue associated with the destination node and transmitted to the destination node.

At block 670, the message is deleted from the local database.

Figure 7:
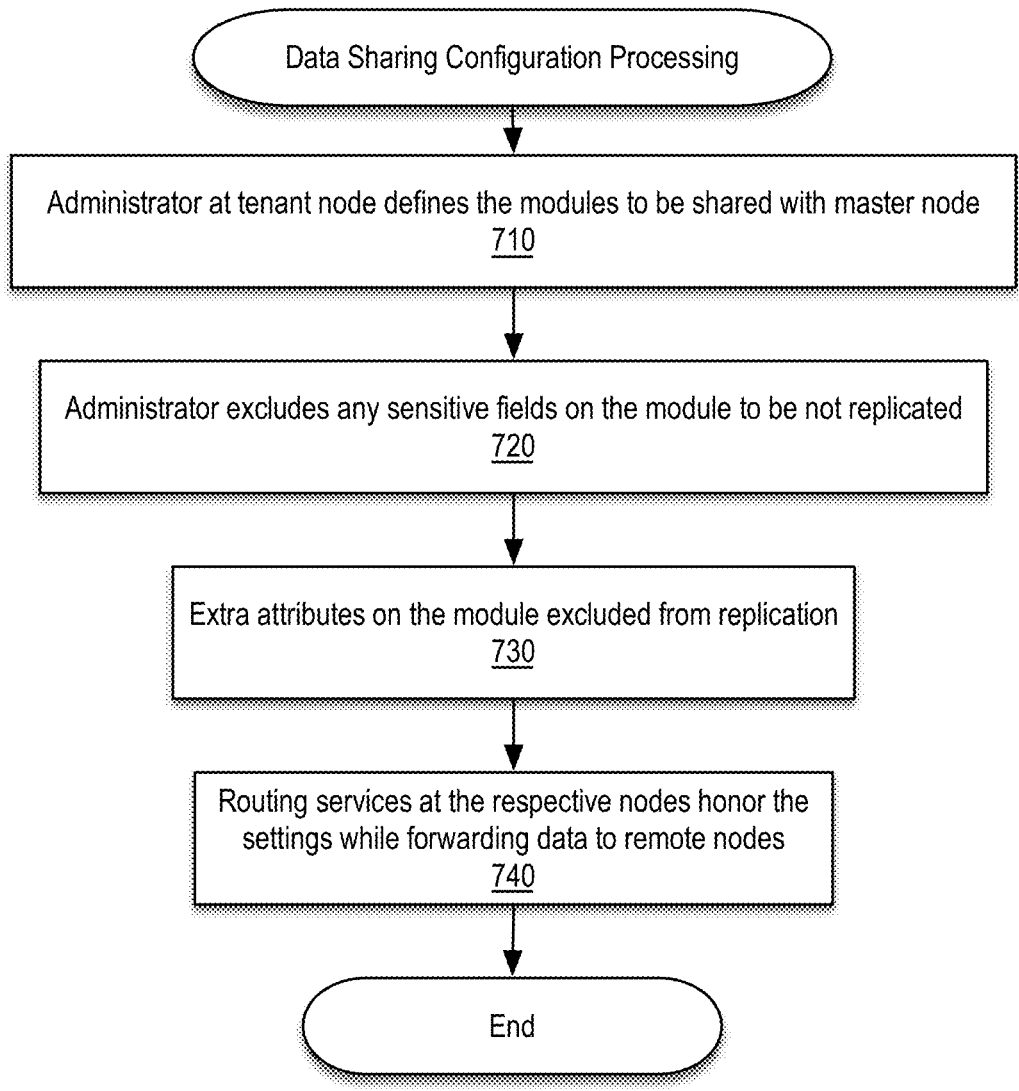
FIG. 7 is a flow diagram illustrating data sharing configuration processing in accordance with an embodiment.

FIG. 7 is a flow diagram illustrating data sharing configuration processing in accordance with an embodiment. In the context of the present example, administrators of the tenant nodes have the ability to define characteristics and features of data replication in a unique fashion at each tenant node. For example, the administrator of a particular tenant node can define data sharing policies that are to be enforced by the particular tenant node so as to protect sensitive customer data.

At block 710, the administrator of the customer premises at which the tenant node resides defines the modules to be shared with the master node. According to one embodiment, the administrator defines which modules should be auto-replicated to the master node. For example, a tenant node can define a policy that any alert created at the node should be auto-forwarded to the master node, but incidents should not be auto-replicated.

At block 720, the administrator excludes any sensitive fields on the module that are not to be replicated. For example, even though alerts from the tenant node may have been identified for replication, some specific fields on the alert may contain customer sensitive data that should not leave the customer premises. As such, in one embodiment, data sharing policies are granular enough to allow field based control on the replication.

At block 730, extra attributes on the module may be excluded from replication. In one embodiment, the master node has the ability to define extra fields on every record that need not be shared back with the tenant. In embodiments, the master node may also have the power to reject the auto-replication of any module from a tenant.

At block 740, The routing service at each of the nodes honors the rules set locally before preparing any data or action message for replication to a remote node.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While embodiments of the present invention have been illustrated and described, it will be clear that the invention is not limited to these embodiments. Numerous modifications, changes, variations, substitutions, and equivalents will be apparent to those skilled in the art, without departing from the spirit and scope of the invention, as described in the claims.

What is claimed is:

1. A method comprising:

facilitating ingestion of alerts relating to network infrastructure of respective computing environments of a plurality of customers of a managed security service provider (MSSP) and provision of a security service tailored for respective customers of the plurality of customers by providing a plurality of tenant secure orchestration and automated response (tSOAR) nodes operable within the respective computing environments, wherein the (tSOAR) nodes control which fields from events and alerts that occur on the corresponding computing environments are auto-replicated to the master SOAR (mSOAR) to independently control what data leaves the respective tenant computing environments;

receiving, by a master secure orchestration and automated response mSOAR node associated with a computing environment of the MSSP and through which the MSSP provides the security service, a plurality of messages via a secure router coupling the MSSP in communication with the respective computing environments of the plurality of customers, wherein the secure router guarantees message delivery between the plurality of tSOAR nodes and the MSSP and the plurality of messages contain information regarding a plurality of alerts relating to the network infrastructure of the respective computing environments of the plurality of customers, wherein the information provided to the mSOAR node is controlled by data sharing policies implemented by the plurality of tSOAR nodes, wherein each tSOAR node of the plurality of tSOAR nodes are logically part of a respective tenant node interposed between the secure router and the respective computing environments and wherein the mSOAR node does not have inbound network connectivity to the computing environment of the customer; and based on an investigation into an alert of the plurality of alerts relating to a network infrastructure of a customer of the plurality of customers, facilitating scalability of the security service and insulating the mSOAR node from heterogeneity among the respective computing environments by causing, by the mSOAR node, a workflow that is invoked as a generic workflow by the mSOAR node and executed aligned with tools and procedures of the respective tSOAR node to provide corresponding security functionality to be remotely executed by a tSOAR node of the plurality of tSOAR nodes within the computing environment of the customer of the plurality of customers; and causing, by the mSOAR node, a workflow for investigation and enrichment of the alert that is invoked as a generic workflow by the mSOAR node and executed aligned with tools and procedures of the respective tSOAR node to provide corresponding security functionality to be remotely executed by a tSOAR node of the plurality of tSOAR nodes within the computing environment of the customer of the plurality of customers.

2. The method of claim 1, wherein remote execution of the workflow by the tSOAR node causes a network security device within the computing environment of the customer to perform an action.

3. The method of claim 2, wherein the network security device comprises a firewall and wherein the action is blocking of network traffic.

4. The method of claim 2, wherein the network security device comprises an intrusion detection system and wherein the action is providing additional information regarding the alert.

5. The method of claim 2, wherein the network security device comprises a Security Information and Event Management (SIEM) system and wherein the action is providing additional information regarding the alert.

6. The method of claim 1, wherein the workflow is triggered responsive to a workflow on the mSOAR node in support of an analyst of the MSSP performing a generic investigation relating to the alert.

7. The method of claim 1, wherein guaranteed delivery of the plurality of messages is facilitated by the implementation of a local database by each of the plurality of tSOAR nodes into which unsent messages of the plurality of messages are stored during periods of loss of connectivity with the secure router.

8. The method of claim 1, wherein guaranteed delivery of the plurality of messages is facilitated by implementation of a local database within the secure router into which undelivered messages of the plurality of messages are stored during periods of loss of connectivity with the mSOAR node.

9. The method of claim 1, wherein a first information from a first customer of the plurality of customers excludes data from a given field based upon the data sharing policies of the first customer, and wherein a second information from a second customer of the plurality of customers includes data from the given field based upon the data sharing policies of the second customer.

10. A system comprising:

one or more processors coupled to one or more memory comprising instructions that, when executed, provide:

a master secure orchestration and automated response (SOAR) node within a computing environment of a managed security service provider (MSSP) that facilitate provision by the MSSP of a security service tailored for respective customers of a plurality of customers;

a plurality of tenant SOAR (tSOAR) nodes within respective computing environments of a plurality of customers of the MSSP that facilitate ingestion of alerts relating to network infrastructure of the respective computing environments, wherein a respective local database is implemented within each of the plurality of (tSOAR) nodes and wherein the (tSOAR) nodes control which fields from events and alerts that occur on the corresponding computing environments are auto-replicated to the master SOAR (mSOAR) to independently control what data leaves the respective tenant computing environments;

a secure router that guarantees message delivery between the plurality of (tSOAR) nodes and the MSSP and logically interposed between the mSOAR node and the plurality of tenant SOAR nodes; and wherein the mSOAR node performs a method comprising:

receiving a plurality of messages via the secure router, wherein the plurality of messages contain information regarding a plurality of alerts relating to the network infrastructure of the respective computing environments and wherein the information provided to the mSOAR node is controlled by data sharing policies implemented by the plurality of (tSOAR) nodes;

based on an investigation into an alert of the plurality of alerts relating to a network infrastructure of a customer of the plurality of customers, facilitating scalability of the security service and insulating the mSOAR node from heterogeneity among the respective computing environments by causing, by the mSOAR node, a workflow that is invoked as a generic workflow by the mSOAR node and executed aligned with tools and procedures of the respective tenant SOAR node to provide corresponding security functionality to be remotely executed by a (tSOAR) node of the plurality of (tSOAR) nodes within the computing environment of the customer of the plurality of customers; and causing, by the mSOAR node, a workflow for investigation and enrichment of the alert that is invoked as a generic workflow by the mSOAR node and executed aligned with tools and procedures of the respective (tSOAR) node to provide corresponding security functionality to be remotely executed by a (tSOAR) node of the plurality of (tSOAR) nodes within the computing environment of the customer of the plurality of customers;

guaranteeing delivery of at least a portion of the plurality of messages by storing unsent messages for one of the plurality of (tSOAR) nodes in the local database of the one of the plurality of (tSOAR) nodes during periods of loss of connectivity with the secure router; and wherein the mSOAR node does not have inbound network connectivity to the computing environment of the customer.

11. The system of claim 10, wherein remote execution of the workflow by the (tSOAR) node causes a network security device within the computing environment of the customer to perform an action.

12. The system of claim 11, wherein the network security device comprises a firewall and wherein the action is blocking of network traffic.

13. The system of claim 11, wherein the network security device comprises an intrusion detection system and wherein the action is providing additional information regarding the alert.

14. The system of claim 11, wherein the network security device comprises a Security Information and Event Management (SIEM) system and wherein the action is providing additional information regarding the alert.

15. The system of claim 10, wherein the mSOAR node need not have inbound network connectivity to the computing environment of the customer.

16. The system of claim 10, wherein the workflow is triggered responsive to a workflow on the mSOAR node in support of an analyst of the MSSP performing a generic investigation relating to the alert.

17. The system of claim 10, wherein a first information from a first customer of the plurality of customers excludes data from a given field based upon the data sharing policies of the first customer, and wherein a second information from a second customer of the plurality of customers includes data from the given field based upon the data sharing policies of the second customer.

18. A system comprising:

one or more processors coupled to one or more memory comprising instructions that, when executed, provide:

a master secure orchestration and automated response (SOAR) node within a computing environment of a managed security service provider (MSSP) that facilitate provision by the MSSP of a security service tailored for respective customers of a plurality of customers;

a plurality of tenant SOAR (tSOAR) nodes within respective computing environments of a plurality of customers of the MSSP that facilitate ingestion of alerts relating to network infrastructure of the respective computing environments, wherein the tSOAR nodes control which fields from events and alerts that occur on the corresponding computing environments are auto-replicated to the mSOAR to independently control what data leaves the respective tenant computing environments;

a secure router logically interposed between the mSOAR node and the plurality of tSOAR nodes that guarantees message delivery between the plurality of tSOAR nodes and the MSSP, wherein a respective local database is implemented within the secure router; and wherein the mSOAR node performs a method comprising:

receiving a plurality of messages via the secure router, wherein the plurality of messages contain information regarding a plurality of alerts relating to the network infrastructure of the respective computing environments and wherein the information provided to the mSOAR node is controlled by data sharing policies implemented by the plurality of tSOAR nodes;

based on an investigation into an alert of the plurality of alerts relating to a network infrastructure of a customer of the plurality of customers, facilitating scalability of the security service and insulating the mSOAR node from heterogeneity among the respective computing environments by causing, by the mSOAR node, a workflow that is invoked as a generic workflow by the mSOAR node and executed aligned with tools and procedures of the respective tSOAR node to provide corresponding security functionality to be remotely executed by a tSOAR node of the plurality of tSOAR nodes within the computing environment of the customer of the plurality of customers; and causing, by the mSOAR node, a workflow for investigation and enrichment of the alert that is invoked as a generic workflow by the mSOAR node and executed aligned with tools and procedures of the respective tSOAR node to provide corresponding security functionality to be remotely executed by a tSOAR node of the plurality of tSOAR nodes within the computing environment of the customer of the plurality of customers;

guaranteeing delivery of at least a portion of the plurality of messages by storing unsent messages for one of the plurality of tSOAR nodes in the local database during periods of loss of connectivity with the secure router; and wherein the mSOAR node does not have inbound network connectivity to the computing environment of the customer.

* * * * *